United States Patent [19]

Logan et al.

[11] Patent Number: 5,006,490

[45] Date of Patent: Apr. 9, 1991

[54] METHOD FOR THE FORMATION OF REFRACTORY PRODUCTS FROM AND DISPOSAL OF ASBESTOS

[75] Inventors: Kathryn V. Logan, Roswell; Jesse D. Walton, Jr., Atlanta, both of Ga.

[73] Assignee: Georgia Tech Research Corporation, Atlanta, Ga.

[21] Appl. No.: 452,818

[22] Filed: Dec. 19, 1989

Related U.S. Application Data

[63] Continuation-in-part of Ser. No. 901,766, Aug. 28, 1986, Pat. No. 4,891,337.

[51] Int. Cl.$^5$ ............... C04B 35/04; C04B 35/10; C04B 35/20

[52] U.S. Cl. ............... 501/155; 501/80; 501/88; 501/96; 501/119

[58] Field of Search ............... 501/80, 96, 155, 88, 501/119, 112

[56] References Cited

U.S. PATENT DOCUMENTS

| | | | |
|---|---|---|---|
| 4,540,475 | 9/1985 | DeAngelis | 501/96 |
| 4,647,405 | 3/1987 | Debely | 501/96 |
| 4,891,337 | 7/1990 | Logan | 501/96 |

*Primary Examiner*—Mark L. Bell
*Attorney, Agent, or Firm*—Hurt, Richardson, Garner, Todd & Cadenhead

[57] ABSTRACT

A method of physically and chemically altering asbestos which comprises mixing the asbestos with a selected metal and reacting the mixture to form an end product including slag, in which the asbestos has been altered allowing its safe disposal or its formation into useful products.

20 Claims, 4 Drawing Sheets

1 inch 1 inch 1 inch

METHOD FOR THE FORMATION OF REFRACTORY PRODUCTS FROM AND DISPOSAL OF ASBESTOS

STATEMENT OF GOVERNMENT INTEREST

Parts of this invention were developed with government support under Contract No. DAAG46-83-K-0163 awarded by the Department of the Army. The government has certain rights in this invention.

CROSS-REFERENCE TO RELATED APPLICATION

This invention is a continuation in part of Ser. No. 901,766, filed on Aug. 28, 1986, now U.S. Pat. No. 4,891,337.

BACKGROUND OF THE INVENTION

The so-called thermite reaction traditionally involves the exothermic reduction of iron oxide with aluminum, in which the reaction produces molten iron with an aluminum oxide slag floating thereon, the reaction taking place either in a suitable mold so that the molten iron is fusion cast into a desired shape, or at a site where two metal parts are to be joined to produce a weld between such metal parts when the reaction is completed.

Although there are prior patents which involve the use of the thermite type reaction to produce borides, carbides, silicides and nitrides and the like, the product produced by the reaction is of at least two phases, one which is a layer of the boride, carbide, etc., and another which is a layer of the oxide of the reducing metal such as aluminum or magnesium. That is, the reducing metal oxide is present as a separate layer of slag, as in the classical thermite reaction. If special steps are taken to produce a composition which is a mixture of the boride, carbide, etc. and the reducing metal oxide, such composition is not a foamed product.

U.K. Pat. No. 1,497,025 teaches the production of cast refractory inorganic products by a thermite type reaction in which slag is formed and the product is a dense, sintered form. Thus, the teaching of this patent is directed to producing a composition which is not a mixture, homogeneous or otherwise, of all the reaction products, but of a composition which is a mixture of the reaction products less the oxide of the reducing metal and (to the extent possible) less the CO which is formed during the reaction. This patent is specifically directed to avoid "poorly sintered specimens" of the desired product and to avoid products which are characterized by "porosity and the presence of free carbon therein, which affects their strength". To this end, the patent teaches a method which is carried out at a centrifugal acceleration of from 100 to 1500 g and in a gaseous medium under pressure of 1 to 100 atm, using an inert gas such as argon. In this patent, the reaction mixture contains carbon and a reducing metal such as aluminum plus one or more metal oxides. The end product in each case is divided into two layers, a top layer of slag which is the reducing metal oxide and the bottom layer which is the desired material. Even if the constraints taught by this patent are not followed and porosity is present, it is not present in a composition which includes the reducing metal oxide.

Present techniques of producing refractory, monolithic shapes involve initial shape-forming steps such as hydraulic or isostatic pressing, slip-casting, extrusion, injection molding and the like prior to the firing step. Moreover, the firing step normally involves at least preheating the entire reaction mixture either to ignition temperature or to an elevated temperature at which local ignition and subsequent completion of the reaction occurs.

SUMMARY OF THE INVENTION

The invention is directed to improvements over existing techniques.

In contrast to the prior art teachings, the invention herein relates to the discovery that precisely shaped, foamed, monolithic and thus highly insulative refractory articles may be produced in situ by controlling the particulate sizes of the reaction components which form the reactive mixture and the composition of the article being a substantially homogeneous dispersion of the products of reaction.

The invention relates to monolithic, shaped refractory articles which are of a foamed nature yielding densities substantially less than the theoretical density of the composition of the article, and the method of making such articles.

This invention involves a powdered exothermic reaction mixture which may be loosely packed into a desired self sustaining shape and dimensions which, after local ignition and resultant reaction in air under ambient conditions, yields a foamed, monolithic article faithfully reproduced in the desired shape and dimensions.

The composition of the article is a substantially homogeneous mixture of the reaction products of the reaction mixture.

The foamed nature of the article, yielding a density less than that of the theoretical density of the composition of the article, and the ability of the reaction mixture to complete its reaction after local ignition in air under ambient conditions and to yield an article faithfully reproducing the shape and dimensions into which the reaction mixture has been loosely packed, are attained by controlling the particle sizes of the components of the reaction mixture and employing aluminum as the reducing metal of the exothermic reaction mixture.

The compositions of the articles of this invention are the reaction products of a thermite type reaction substantially homogeneously dispersed throughout the article and the article itself is characterized by its foamed nature and its faithful reproduction of the dimensions and shape into which the reaction mixture has been loosely packed.

The composition of the articles of this invention is preferred to be $TiB_2$ in $Al_2O_3$.

The reactive mixture of this invention is easily shaped by lightly packing it in a mold cavity defining the desired shape and dimensions of the article, the material defining the mold cavity being made of any suitable material which is capable of withstanding the temperatures involved during the reaction and which do not require great structural integrity other than to confine the lightly packed reactive mixture and retain the desired shape of the article before and during the reaction.

Moreover, the particulate size control renders the molded reactive mixture locally ignitable in air under atmospheric conditions without preheating the mass thereof, after which ignition the reaction proceeds to completion throughout the reaction mixture to produce the shaped article.

The method of this invention, then, is both energy and cost efficient and of minimal complexity, capable of allowing the production of shaped articles of highly refractory properties due not only to the composition of the article but also to the foamed nature thereof.

Insofar as the critical feature of particulate sizes of the components of the reaction mixture is concerned, I have found that all components must be of powder form to pass a screen of 50 mesh size, that is, not being retained on mesh size of larger openings. By mesh size is meant U.S. Standard mesh.

However, with respect to the ability of the reaction mixture to be ignited locally and thereafter react to completion in air under ambient conditions, it has been found that the reaction mixture must contain a substantial amount of $TiO_2$ which is of $-300$ mesh size, of $B_2O_3$ which is of $-100$, $+200$ mesh size or less and of Al which is of $-100$, $+200$ mesh size or less.

The method of this invention does not require a special environment or other special preparation and/or reaction procedures such as preheating the reaction mixture mass, the use of controlled atmosphere during reaction, the application of centrifugal effect before or during reaction or the use of pressure to pre-form the reaction mixture. The "green" condition of the shaped reaction mixture prior to ignition is simply as a mass of powder which is loosely packed so as to attain the desired shape. Under these circumstances, ignition takes place in response to local heating in air at atmospheric pressure and may be effected by local heating as by a resistance heated nichrome wire until ignition occurs, whereafter the exothermic reaction progresses through the reaction mass until complete. A further advantage of the present invention is that the reaction achieves a less violent conversion of reactants to product than prior thermite reactions.

In accord with this invention, it is to be noted that the article formed is a composition derived from the two oxides which are present in the reaction mixture. Although it is preferred that this composition be that which results from stoichiometric amounts of these two components and of the reducing metal, it is not strictly necessary for successful compositions. For example, when titanium dioxide ($TiO_2$) and boron oxide ($B_2O_3$) are combined with aluminum in the reaction mixture, an excess of boron oxide will produce a composition which is titanium diboride ($TiB_2$) plus the excess boron oxide plus aluminum oxide ($Al_2O_3$) formed during the reaction. Similarly, if the reaction mixture were formed of stoichiometric amounts of the two oxides and an excess of the reactive metal aluminum, the product would be titanium diboride plus aluminum plus aluminum oxide.

A number of advantages can be realized by using the exothermic, self-propagating nature of thermite reactions as a means of synthesizing and processing refractory materials such as low-cost oxide raw materials can be used; temperatures required to initiate the reaction are relatively low, usually 600°–1000° C.; the reaction generates extremely high temperatures (up to 3000° C.) eliminating the need for external and expensive sources of heat; materials with unique properties can be formed; and the same type of reaction can be used to form a number of compounds.

It is well recognized that asbestos in its many forms is dangerous to human health, and nationwide efforts are presently under way to eliminate it from areas where people are exposed to it. Disposal of asbestos is accomplished by using expensive, approved hazardous-waste landfills.

A further object of this invention is to chemically or physically alter asbestos so that it can be disposed of in an economic and safe manner. We have found that asbestos could be rendered harmless to the environment and to human life by incorporating it in a suitable thermite reaction of the type discussed above. The term thermite reaction is used to describe an oxide/metal reaction which provides its own oxygen supply. Depending on the chemical composition of the asbestos and associated materials, the process of rendering the asbestos harmless may be accomplished through a number of possible thermite reactions.

Chemically, asbestos is about 43% MgO, 43% $SiO_2$ and 13% $H_2O$ and can be described by the formula $3MgO.2SiO_2.2H_2O$. In the typical installations where asbestos has been used in commercial and industrial thermal insulation applications, and from which it must be safely removed and disposed, it is combined with other light weight mineral products such as perlite, mineral wool and vermiculite. Perlite is an amorphous silicate mineral derived from volcanic glass and is similar to mineral wool in composition. Vermiculite is a hydrous lithium, magnesium, aluminum silicate. Thus, all of these materials associated with asbestos are similar in that they are essentially naturally occurring silicate minerals containing magnesium oxide and various amounts of the oxides of aluminum and/or alkaline metals. For the purpose of this specification, the mixture of the various materials with asbestos will be referred to simply as "asbestos". In the various thermite equations, the chemical composition of asbestos will be used recognizing that the silicon and water from any perlite, mineral wool and vermiculite present will be available for reaction.

In using the thermite reaction to render asbestos harmless, three different basic processes are possible involving asbestos and the active thermite ingredients. In the first process, the asbestos (MP=1500° C.) does not take part chemically in the thermite process, but is decomposed and melted as a result of the high temperatures (up to 3000° C.) generated by the exothermic reaction of the thermite ingredients when mixed with the asbestos and ignited. In the second process, the asbestos takes part in the thermite reaction and is chemically as well as physically modified by the reaction. In the third process, the thermite reaction depends entirely on the reaction of an active metal, such as aluminum or magnesium, with the silica and water components of the asbestos generating the high temperatures rendering the asbestos harmless.

In those processes in which the asbestos and associated materials react chemically, that is, taking part in the thermite reaction, only the silica, in the form of silicon dioxide, and chemically bound water in these materials would be expected to take part in the reaction. Thus, the principal product produced from the asbestos thermite reaction would be silicon metal and the oxides of aluminum or magnesium. In addition to producing silicon, suitable additions to the thermite composition can be used to produce a wide range of silicides as well as silicon carbide. These three basic processes and the types of products produced in the thermite reaction to render asbestos harmless are illustrated in Examples 12–14 below.

By employing self-sustaining high-temperature thermite reactions to successfully alter asbestos, the end product could be disposed of harmlessly in landfills. Further, it is highly likely that the end product could be of commercial value by forming the end product into a refractory or some other useful material.

The above and other objectives of the invention will become more apparent upon reading the accompanying detailed description of the invention with reference to the attached drawings described below.

BRIEF DESCRIPTION OF THE DRAWING FIGURES

DETAILED DESCRIPTION OF THE INVENTION

Figure 1:
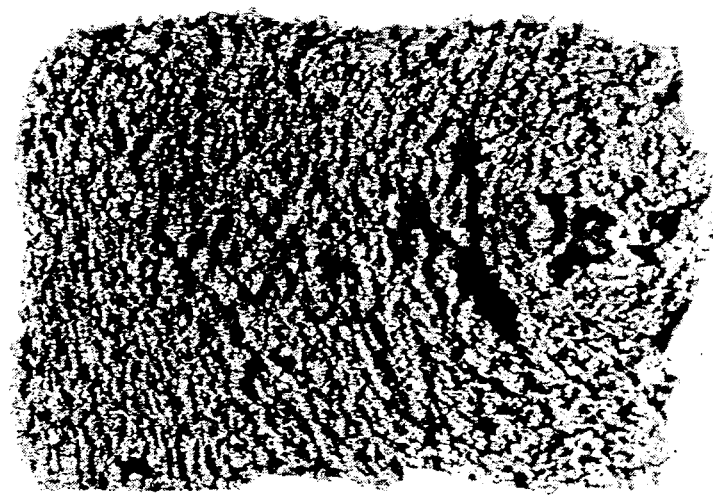
FIG. 1 is a microphotograph illustrating the ideal, substantially homogeneously foamed nature of products made according to the invention.

Reference to FIG. 1 illustrates the ideal, substantially homogeneously foamed nature of products made according to this invention. The article whose microphotograph is illustrated in FIG. 1 has the composition $TiB_2$-$Al_2O_3$ and is a highly refractory and hard product having a density of less than about 50% of the theoretical density of the composition, titanium diboride plus alumina.

A reaction chamber has been designed for self-propagating high-temperature synthesis reactions. A two-piece refractory reaction vessel inside the chamber is used to contain the heat and materials of the process. To provide extra protection against rapid violent exothermic events, the unit is lined with protective barrier materials on three sides and the top, refractory bricks on the bottom, and viewing window on a fourth vertical surface. The chamber is vented to an exhaust hood to minimize the entry of airborne products into the laboratory environment.

The following Examples will demonstrate the invention.

EXAMPLE 1

Figure 3:
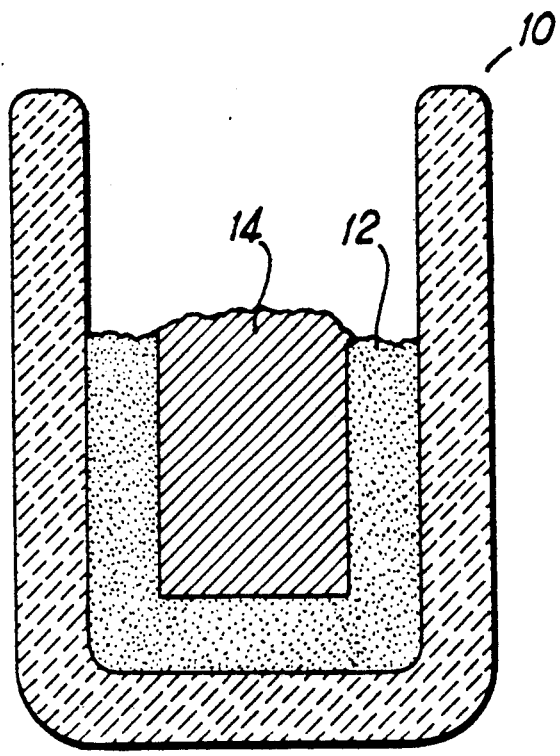
FIG. 3 is a vertical section taken through an SCFS crucible containing a reaction powder mixture according to this invention and having a core of powdered alumina, prior to ignition.

The stoichiometric reaction mixture consisting of 8.34 parts by weight $TiO_2$ of $-300$ mesh particle size, 9.39 parts by weight $B_2O_3$ of $-100, +200$ mesh particle size, 7.27 parts by weight Al of $-100, +200$ particle size, intimately mixed, formed the powdered reaction mixture. An amount of this mixture was loosely packed in a slip-cast fused silica (SCFS) crucible 10 as in FIG. 3 between the crucible and a suitably shaped core (not shown) and the core was removed to leave the shaped reaction mixture mass 12 within the crucible 10. The core space was then filled with $-200, +300$ $Al_2O_3$ powder 14. The crucible including the reaction mixture was placed inside the reaction chamber described above.

Figure 4:
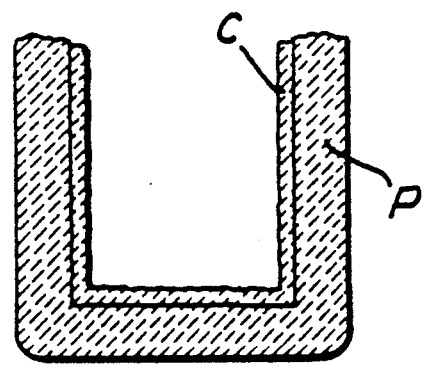
FIG. 4 is a view similar to FIG. 3 but illustrating the product attained after ignition and cooling and before removal of the core.

The reaction mixture was ignited in air under ambient conditions by means of an electrically heated nichrome wire (not shown). Upon ignition, the exothermic reaction proceeded throughout the reaction mass at a rate of about 25 mm/sec. to completion. The appearance of the reacted mixture and core material C was as is shown in FIG. 4, the article P having a homogeneously foamed nature as in FIG. 1, whose outer surface assumed the exact shape of the inner surface of the crucible 10 and whose inner surface assumed substantially the same shape as the originally formed core space. The core C was of substantially the same composition as the starting filler material 14 (alumina) and although fused by the heat of the reaction, was easily removed from the crucible shape of the article P. The weight per volume of the article P was found to be about 1.44 $gm/cm^3$ which, based upon the theoretical density of the composition of the article represents about 30-40% thereof.

Figure 2:
FIG. 2 is a photograph of a shaped refractory product of the present invention.
Figure 5:
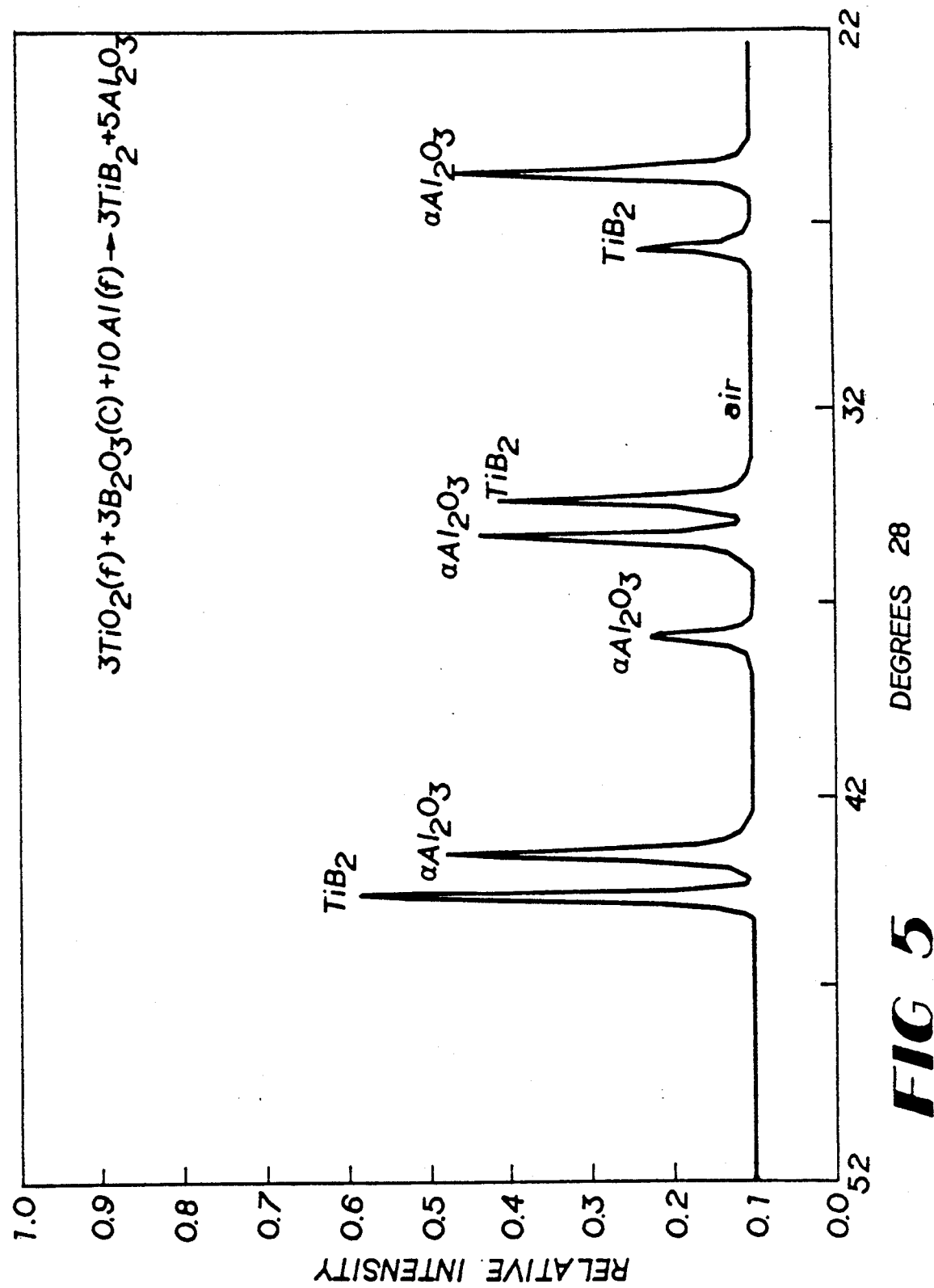
FIG. 5 is an X-ray diffraction chart of products formed by the invention.

FIG. 2 is a photograph of the resulting article P. FIG. 5 illustrates a typical X-ray diffraction trace of the article P and indicates that the composition of the article is $TiB_2$ and $Al_2O_3$ X-ray diffraction traces of samples of other articles obtained from reaction of the aforesaid reaction mixture in air or argon under pressure of 1-100 atmospheres showed little, if any, difference in composition, although in samples which had been ignited in air under pressure, small amounts of TiN could be observed. Also, samples ignited and reacted in argon under pressure tended to densify and begin phase separation.

EXAMPLE 2

In this example, the same stoichiometric components of the reaction mixture were uniformly mixed but in this case, the particulate size of the Al was changed to $-300$ mesh, the reaction mixture otherwise being the same as in Example 1. When this reaction mixture was subjected to local heating as in Example 1, ignition took place at 1230° F. but the resultant article was not homogeneously foamed as was the case with Example 1 and as depicted in FIG. 1. Instead, the porosity was uneven so that uniform refractory performance was not attained.

EXAMPLE 3

In this example, the same stoichiometric components of the reaction mixture were uniformly mixed, but in this case the particulate size of the $B_2O_3$ was changed to $-300$ mesh, the reaction mixture otherwise being the same as in Example 1. The reaction mixture was ignited in air as in Examples 1 and 2 by local heating. Even though the crucible shattered during the reaction, the reaction product resulted in a foam similar to that of Example 1 which retained the crucible shape. The weight of the material after ignition as 23 grams, less than that of Example 1.

EXAMPLE 4

In this Example, the same stoichiometric components of the reaction mixture were uniformly mixed but in this case all three of the components were $-300$ mesh particle size. Again, ignition was by local heating in air. The reaction proceeded as in Example 7 with the crucible being shattered. The reaction product was a foam similar to that of Example 1 except that the center melted. The weight of the material after ignition was 21.5 grams.

EXAMPLES 5-8

In these Examples all of the remaining eight possible particulate size combinations of $-100, +200, -300$ of the reaction mixture were made and ignition attempted.

However, none both ignited and sustained the reaction in air under ambient conditions as in Examples 1 and 2 and no article, foamed or otherwise was formed.

EXAMPLE 9

In this Example, three parts by weight of the reaction mixture of Example 2 was mixed with one part by weight of the reaction mixture of Example 1. Ignition in air under ambient conditions took place and the reaction went to completion, producing an article which was substantially homogeneously foamed as in FIG. 1 and having about the same density. Thus, the presence of about 25% of the $TiO_2$ of $-300$ mesh size with the remainder being of $-100$, $+200$ mesh size improved the foaming characteristic of Example 2 to the ideal, substantially homogeneous foamed article.

EXAMPLE 10

It was noted that if the powder was loosely placed in a crucible which did not restrict the shape, a friable, loose homogeneous mass was obtained.

EXAMPLE 11

In this Example, the selected reactions were carried out with asbestos carrier materials consisting of mineral wool, or fibers made by blowing air or steam through slag. Testing consisted of mixing the mineral wool with appropriate compositions, such as the metal oxide and the metal, and initiating the reaction. The reactions were initiated by the resistance-heated hot wire ignition. The reaction may also be initiated by furnace autoignition. Mixtures were reacted in loose powder form. The results were a fused mass of metal oxide, metal and silica from the mineral wool such as a fused mass of iron oxide, alumina and silica. The mineral wool was completely physically and chemically altered. In this Example, tests were carried out with different proportions of thermite to mineral wool including, for example, 1:1, 2:3, and 1:3 thermite:mineral wool ratios.

Examples 12-14 are theoretical examples based on the above experiments using mineral wool instead of asbestos due to the inherent dangerous nature of asbestos.

EXAMPLE 12

In this Example, based on the reaction $$Fe_2O_3 + 2Al + (3MgO.2SiO_2.2H_2O) \rightarrow 2Fe + (Fused\ Al_2O_3, 3MgO, 2SiO_2, 2H_2O),$$

the high temperatures generated from the thermite reaction of the aluminum with the oxides is sufficiently high to decompose and fuse the asbestos and incorporate it into the resultant product. In this case, the harmless slag can be disposed of as a waste material. This slag would be similar to any other slag produced from the usual processes of making iron.

Of course, different metal oxides can be substituted for the iron oxide and the metal of that oxide produced from the thermite reaction. For example, titanium dioxide can be substituted for the iron oxide which after reaction with the aluminum would result in titanium metal and decomposed asbestos fused into the resultant product. Suitable metal oxides include any metal oxide such as $TiO_2$, $B_2O_3$, and $SiO_2$, as this is an oxidation/reduction reaction. The slag, however, would basically be the same. Additionally, any other free metal, such as magnesium, may be used in place of aluminum. The result of this Example comprises chemically and physically altered asbestos which can be formed into usable structural products.

EXAMPLE 13

In this Example, based on the reactions $$Fe_2O_3 + 4Al + (3MgO.2SiO_2.2H_2O) \rightarrow 2FeSi + (Fused\ 2Al, 3MgO, 2H_2O)$$

$$Fe_2O_3 + 9Mg + (3MgO.2SiO_2.2H_2O) \rightarrow 2FeSi + (12MgO, 2H_2O)$$

The reaction is designed so that the thermite process would result from the reaction of the active metal (aluminum or magnesium) with the silicon dioxide and water in the asbestos as well as with the iron oxide. Depending on the actual reaction components and their ratios, there may or may not be melting of the iron silicide, allowing it to be separated from the slag. For example, if aluminum is used as the metal, a fused molten product is produced in which the specific gravity of the slag is different than the specific gravity of the iron silicide, thus allowing separation. In contrast, if magnesium is used as the metal, a powder product is produced which is not amenable to this type of separation. In this case, if not melted, the resulting silicide and slag would form a heterogeneous composite type product.

By proper compounding, that is, by proper selection of reaction components and proper sizing of the reaction components, it is possible that this product could be formed into a useful shape during the thermite reaction (such as a building block) or subsequently reduced to the form of an aggregate that could be incorporated in a useful end product. For example, the use of aluminum as the metal allows the formation of refractory shapes, while the use of magnesium as the metal allows the formation of a powder product.

If magnesium is used as the active metal and the resulting slag is primarily MgO and other alkaline oxides, it is possible to separate the slag from the silicide by acid leaching, as alkaline oxides are susceptible to acid leaching. The other alkaline oxides which are suitable as well as the acid leaching process which is suitable can be found in my co-pending U.S. patent application Ser. No. 06/901,766 which is incorporated herein by this reference. Of course, a wide range of silicides are possible using this process. For example, molybdenum oxide could be substituted for iron oxide and molybdenum disilicide would be the end product.

EXAMPLE 14

In this Example, based on the reactions $$(3MgO.2SiO_2.2H_2O) + 4Al \rightarrow 2Si + (2Al_2O_3, 3MgO, 2H_2O)$$

$$(3MgO.2SiO_2.2H_2O) + 6Mg \rightarrow 2Si + (9MgO, 2H_2O),$$

the silica ($SiO_2$) content of the asbestos is sufficient to produce a thermite reaction when reacted with aluminum or magnesium, resulting in the production of silicon metal. The final product of this reaction would be a composite material consisting of a heterogeneous mixture of silicon, aluminum oxide and magnesium oxide along with residual alkaline metal oxides from the asbestos depending on the metal used. For example, as described above, if aluminum is used as the metal, a fused shape may be formed, and if magnesium is used as the metal, powders may be formed.

This product could be disposed of without further treatment or incorporated into some useful product. On the other hand, if the product consists primarily of silicon and alkaline metal oxides (using the reaction with magnesium) then the silicon could be separated from the oxides by acid leaching. Again, for suitable alkaline oxides and the acid leaching process, see my co-pending U.S. patent application Ser. No. 06/901,766 which is incorporated herein by this reference. In this case, the by-product (silicon) could make the process highly economical. This process can of course be further modified to produce silicon carbide by including carbon in the reaction as in the following equation:

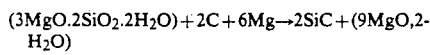

$$(3MgO.2SiO_2.2H_2O) + 2C + 6Mg \rightarrow 2SiC + (9MgO, 2H_2O)$$

As described before, using magnesium as the metal will result in a powder product. If aluminum is substituted for the magnesium metal, a fused shape will be formed.

In Examples 12-14 the asbestos is rendered harmless and the thermite reaction can range from a simple and safe way to render asbestos harmless to a means of producing a product with a significant market value.

I claim:

1. A method of altering asbestos allowing for its disposal comprising:
    mixing asbestos and a metal selected from the group consisting of aluminum and magnesium in a ratio to form an exothermic reaction mixture; and
    reacting the exothermic reaction mixture heating to a temperature sufficient to ignite the mixture to form an end product in which the asbestos has been altered.

2. A method of altering asbestos as described in claim 1, wherein the metal is aluminum.

3. A method of altering asbestos as described in claim 1, wherein the metal is magnesium.

4. A method of altering asbestos as described in claim 1, wherein the end product includes silicon metal.

5. A method of altering asbestos as described in claim 1, wherein the and product includes primarily silicon metal and alkaline metal oxides.

6. A method of altering asbestos as described in claim 5, further including the step of leaching the silicon from the end product by acid leaching.

7. A method of altering asbestos as described in claim 1, further including the steps of adding carbon and mixing the carbon with the asbestos and the metal to form the exothermic reaction mixture, thereby forming silicon carbide in the end product upon reaction of the exothermic reaction mixture.

8. A method of altering asbestos as described in claim 1, further including the step of adding a metal oxide selected from the group consisting of iron oxide $TiO_2$, $B_2O_3$ and molybdenum oxide with the asbestos and the metal to form the exothermic reaction mixture.

9. A method of altering asbestos as described in claim 8, wherein the asbestos, metal and metal oxide are mixed in a ratio whereby upon reaction of the exothermic reaction mixture an exothermic reaction occurs releasing sufficient heat of reaction to decompose and fuse the asbestos into the resulting end product.

10. A method of altering asbestos as described in claim 8, wherein the asbestos, metal and metal oxide are mixed in a ratio whereby upon reaction of the exothermic reaction mixture an end product is formed including a silicide.

11. A method of altering asbestos as described in claim 10, further including the step of forming the exothermic reaction mixture into a shape prior to reaction of the exothermic reaction mixture, whereby the end product substantially retains said shape.

12. A method of altering asbestos as described in claim 10, wherein the asbestos, metal and metal oxide are mixed in a ratio so as to result in melting the silicide during reaction of the exothermic reaction mixture and the formation of an end product consisting of melted silicide and slag.

13. A method of altering asbestos as described in claim 12, further including the step of separating the silicide from the slag.

14. A method of altering asbestos as described in claim 10, wherein the metal is aluminum.

15. A method of altering asbestos as described in claim 10, wherein the metal is magnesium.

16. A method of altering asbestos as described in claim 15, wherein the end product consists of silicide and slag, the slag including primarily magnesium oxide and other alkaline oxides.

17. A method of altering asbestos as described in claim 16, further including the step of separating the slag from the silicide by acid leaching.

18. A method of altering asbestos as described in claim 17, wherein the metal oxide is $Fe_2O_3$ and the resulting metal silicide formed is FeSi.

19. A method of altering asbestos as described in claim 17, wherein the metal oxide is $TiO_2$ and the resulting metal silicide formed is titanium silicide.

20. A method of altering asbestos as described in claim 17, wherein the metal oxide is $B_2O_3$ and the resulting metal silicide formed is boron silicide.

* * * * *